United States Patent [19]
Hart et al.

[11] 4,014,827
[45] Mar. 29, 1977

[54] SUBSTRATE REINFORCED RUBBER STRUCTURE AND COMPOUND FOR FORMING SAME

[75] Inventors: David R. Hart; Wade K. Cunningham, both of Birmingham, Ala.

[73] Assignee: United States Pipe and Foundry Company, Birmingham, Ala.

[22] Filed: Mar. 10, 1975

[21] Appl. No.: 556,693

[52] U.S. Cl. .......................... 260/3; 156/110 MD; 260/14; 260/38; 260/42.18; 260/42.22; 260/248.5; 260/842; 260/845; 260/846; 260/857 F

[51] Int. Cl.$^2$ .......................................... C08L 7/00

[58] Field of Search ........... 260/3, 845, 846, 248.5, 260/38, 42.18, 42.22, 14, 857 F, 842

[56] References Cited
UNITED STATES PATENTS

| | | | |
|---|---|---|---|
| 2,618,664 | 10/1952 | Hess et al. | 260/248.5 |
| 2,697,122 | 12/1954 | Hess et al. | 260/248.5 |
| 3,194,294 | 7/1965 | Van Gils | 260/845 |
| 3,638,703 | 2/1972 | Ender | 260/248.5 |
| 3,843,643 | 10/1974 | Ackerman et al. | 260/248.5 |

*Primary Examiner*—J. Ziegler
*Attorney, Agent, or Firm*—Woodford R. Thompson, Jr.

[57] ABSTRACT

Reaction products of phenol and hexamethylenetetramine act as methylene donors in rubber compounds containing acceptors such as free resorcinol or precondensed resorcinol-formaldehyde (RF) resins. The products of reaction between this methylene donor and various methylene acceptors produce excellent adhesion between the rubber compounds and reinforcing substrates. Reinforcement of the rubber compound is obtained and this donor does not cause degradation of polyester cord used as a reinforcing substrate.

6 Claims, No Drawings

SUBSTRATE REINFORCED RUBBER STRUCTURE AND COMPOUND FOR FORMING SAME

BACKGROUND OF THE INVENTION

This invention relates to rubber compouding and, more specifically, to the compounding of rubber which is to be bonded to reinforcing substrates. As is well known, the chemical make-up of reinforced rubber compounds is complex, and the demand for performance over widely varying conditions of stress and temperature has caused an increase in the variety of reinforcing substrates being used. Substrates such as polyester, nylon and steel are commonly used to reinforce rubber in the manufacture of pneumatic tires, pressure hoses and the like. It is well known to incorporate certain methylene donors and acceptors in the rubber compound in order to increase the bond between the rubber and the reinforcing substrates. It is also well known that some of the methylene donor-acceptor additions result in degradation of certain reinforcing substrates. For example, in the Endter et al U.S. Pat. No. 3,638,703, dated Feb. 1, 1972, reference is made to the degradation of polyester cord at high temperatures where hexamethylenetetramine is used as a methylene donor with resorcinol being used as a methylene acceptor. To reduce such degradation of polyester cord hexamethylenetetramine was first reacted with certain acids, and then the reaction products were used as methylene donors in the well-known donor-acceptor relationship. The use of resorcinol as an acceptor has not been entirely satisfactory since it must be added to the rubber compound at an elevated temperature, and at this temperature, resorcinol fumes, thereby liberating vapors which are noxious to persons working nearby. To reduce such problems, resorcinol has been prereacted to form the well known resorcinol-formaldehyde (RF) resins which have been used in place of resorcinol as methylene acceptors. However, the use of hexamethylenetetramine as a dnor with RF resin used as an acceptor has not been satisfactory because the adhesion thus obtained between the rubber and the substrate is poor. Accordingly, a search for satisfactory donors for use with RF resins has been conducted for several years. So far as we are aware, the only donor known to be satisfactory for use with RF resins is hexamethoxymethylmelamine which retards the rate of cure of the rubber compound in which the hexamethoxymethylmelamine was incorporated.

SUMMARY OF THE INVENTION

In accordance with our invention phenol is reacted with hexamethylenetetramine to produce reaction products which are excellent methylene donors when used with the well known RF resin as an acceptor. We have also found that such reaction products can be used as a methylene donor with resorcinol as the acceptor. Furthermore, excellent adhesion is obtained between the rubber compound and the reinforcing substrate with either of the acceptors. Such use of a reaction product of phenol as a donor was entirely unexpected due to the fact that phenol has always been considered an acceptor, as disclosed in the Endter et al U.S. Pat. No. 3,683,703 mentioned above.

DETAILED DESCRIPTION

Our methylene donor comprising the reaction products of phenol and hexamethylenetetramine is preferably made by the process described in the Orem et al U.S. Pat. application Ser. No. 500,906, filed Aug. 27, 1974. The present application and said application Ser. No. 500,906 are owned by a common assignee. In accordance with the process disclosed in patent application Ser. No. 500,906 one mole of hexamethylenetetramine may be reacted with one, two or three moles of phenol. Also, our methylene donor may be made by combining aqueous solutions of phenol and hexamethylenetetramine, allowing a precipitate to form, and substantially filtering off and drying the precipitate. However, our present invention relates to the novel use of the reaction product of phenol and hexamethylenetetramine to produce an improved rubber compound and reinforced structure, regardless of the manner in which the products are produced.

The benefits to be gained by the use of the reaction products of phenol and hexamethylenetetramine in rubber compounds of Table 1 reinforced with nylon are shown below.

TABLE I

|  | Ingredients | Parts by Weight Amount |
|---|---|---|
| 1. | SMR-5L (Natural Rubber) | 75 |
| 2. | SBR-1502 (Styrene-Butadiene Copolymer) | 25 |
| 3. | Carbon Black (Reinforcing Agent) | 45 |
| 4. | Silica (Reinforcing Agent) | 15 |
| 5. | Zinc Oxide (Cure Activator) | 3 |
| 6. | Stearic Acid (Cure Activator) | 1 |
| 7. | Naphthenic Oil (Softener) | 10 |
| 8. | Resorcinol (Methylene Acceptor) | 2.5 |
| *9. | N-Oxydiethylene Benzothiazole-2-Sulfenamide (Accelerator) | 1.25 |
| *10. | Diphenyl Guanidine (Accelerator) | 0.25 |
| *11. | Sulfur (Vulcanizing Agent) (20% Oil) | 3.15 |

*Added on Open Mill

The composition of Table 1 was maintained constant throughout this particular test, except in one case where resorcinol was eliminated, and various methylene donors were also added on the open mill and in the quantities indicated. From the resulting compounds, test samples were formed around square-woven nylon (greige) cured for sixty minutes at 300° F, and adhesion was determined in a conventional manner well known to those skilled in the art.

| Experiment Number | Acceptor (2.5 parts per 100 parts Rubber) | Donor | Parts Donor per 100 parts Rubber | Strip Adhesion (Pounds) | 95% Cure (Minutes) |
|---|---|---|---|---|---|
| 1A | Resorcinol | Hexamethylenetetramine | 1.6 | 88 | 18.8 |
| 2A | " | Reaction product of 3 moles phenol to 1 mole hexamethylenetetramine | 2.0 | 99 | 20.0 |
| 3A | " | " | 4.0 | 70 | 16.8 |
| 4A | " | " | 6.0 | 52 | 14.5 |
| 5A | None | " | 4.0 | 2 | 14.0 |

Experiment 1A is included to show comparison to prior art.

No resorcinol was used in Experiment Number 5A to show that the adhesion obtained resulted from the acceptor-donor system and not from the reaction product of phenol and hexamethylenetetramine alone. It is well known that resorcinol alone does not significantly increase the adhesion of rubber compounds to reinforcing substrates.

With the exception of substituting a conventional precondensed resorcinol-formaldehyde resin, an RF resin, for the resorcinol, the composition of TABLE 1 was further used in the experiments shown below. Various methylene donors were also added on the open mill and in the quantities indicated. From the resulting compounds, test samples were formed around square-woven nylon (greige) cured for 60 minutes at 300° F, and adhesion was determined in a manner well known to those skilled in the art.

| Experiment Number | 300% Modulus (Stress required to produce a 300% elongation (psi) | Elongation % at the time of rupture |
|---|---|---|
| 1B | 925 | 520 |
| 2B | 1270 | 440 |
| 3B | 1270 | 460 |
| 4B | 1350 | 440 |

By way of comparison, with the compound obtained in Experiment 1A a stress of 1270 psi was required to produce a 300% elongation, with the elongation being 460%.

The benefits to be gained by the use of the reaction products of phenol and hexamethylenetetramine in

| Experiment Number | Acceptor (2.5 parts) per 100 parts Rubber) | Donor | Parts Donor per 100 parts Rubber | Strip Adhesion (Pounds) | 95% Cure (Minutes) |
|---|---|---|---|---|---|
| 1B | RF Resin | Hexamethoxymethylmelamine | 3.0 | 56 | 60 |
| 2B | " | Reaction product of 3 moles phenol to 1 mole hexamethylenetetramine | 2.0 | 70 | 25 |
| 3B | " | " | 3.0 | 40 | 25.5 |
| 4B | " | " | 4.0 | 26 | 17.5 |

Experiment 1B is included to show comparison to prior art.

Certain physical properties, indicative of reinforcement of the rubber compound, where also determined on the compounds obtained in Experiments 1B through 4B.

rubber compounds of Table 2, reinforced with steel cord are shown below.

TABLE 2

| | Ingredients | Parts by Weight Amount |
|---|---|---|
| 1. | SMR-5L (Natural Rubber) | 100 |
| 2. | Carbon Black (Reinforcing Agent) | 45 |
| 3. | Silica (Reinforcing Agent) | 15 |
| 4. | Zinc Oxide (Cure Activator | 5 |
| 5. | Stearic Acid (Cure Activator) | 1 |
| 6. | N- (1, 3-dimethyl butyl)-N'phenyl-p-phenylene Diamine (Antidegradant) | 3 |
| 7. | Naphthenic Oil (Softener) | 8 |
| 8. | Resorcinol (Methylene Acceptor) | 1.2 |
| *9. | 2-(Morpholinothio) Benzothiazole (Accelerator) | 0.8 |
| *10. | Sulfur (Vulcanizing Agent) (20% Oil) | 3.75 |

*Added on Open Mill

The composition was maintaned constant throughout this particular test, and various methylene donors were also added on the open mill and in the quantities indicated. From these compounds, test samples were formed around brassed steel tire cord, cured for 45 minutes at 300° F, and adhesion determined in a manner well known to those skilled in the art.

| Experiment Number | Acceptor (1.2 parts per 100 parts Rubber) | Donor | Parts Donor per 100 parts Rubber | Pullout Adhesion (Pounds) | 95% Cure (Minutes) |
| --- | --- | --- | --- | --- | --- |
| 1C | Resorcinol | Hexamethylenetetramine | 0.8 | 172 | 20 |
| 2C | " | Reaction product of 3 moles phenol to 1 mole hexamethylenetetramine | 0.8 | 154 | 17 |
| 3C | " | " | 1.2 | 182 | 19 |
| 4C | " | " | 1.6 | 149 | 19 |

The experiment 1C is included to show comparison to prior art.

The composition of Table 2 was further used in the experiments shown below, and the amounts of acceptor and/or donor were varied as shown.

| Experiment Number | Acceptor | Donor | Parts Donor per 100 parts Rubber | Pullout Adhesion (Pounds) | 95% Cure (Minutes) |
| --- | --- | --- | --- | --- | --- |
| 1D | RF Resin 1.5 parts per 100 parts rubber | Reaction product of 3 moles phenol to 1 mole hexamethylenetetramine | 1 | 131 | 14 |
| 2D | " | " | 1.5 | 152 | 18 |
| 3D | " | " | 2 | 161 | 19 |
| 4D | " | Reaction product of 2 moles phenol per 1 mole hexamethylenetetramine | 1.5 | 187 | 21 |
| 5D | " | Reaction product of 1 mole phenol per 1 mole hexamethylenetetramine | 1.5 | 168 | 20 |
| 6D | " | Salt of Hexamethylenetetramine and Toluenesulfonic Acid | 1.5 | 165 | 20 |
| 7D | Resorcinol 1.2 parts per 100 parts rubber | Hexamethylenetetramine | 0.8 | 172 | 20 |

Experiments 6D and 7D are included to show comparison to prior art.

The physical properties of certain of the above compounds were also measured to determine whether the reaction product of phenol and hexamethylenetetramine enhanced reinforcement of the compound.

| Experiment Number | 95% Cure Time (Minutes) | 300% Modulus (Stress required to produce a 300% elongation) (psi) | Elongation % at the time of rupture |
| --- | --- | --- | --- |
| 2D | 18 | 1490 | 420 |
| 4D | 21 | 2330 | 360 |
| 5D | 20 | 2120 | 390 |
| 7D | 20 | 2090 | 400 |

Further tests were made with a composition shown in Table 3.

TABLE 3

| | Ingredients | Parts by Weight Amount |
| --- | --- | --- |
| 1. | SMR-5L (Natural Rubber) | 50 |
| 2. | SN-600 (Natural Rubber) | 50 |
| 3. | Carbon Black (Reinforcing Agent) | 45 |
| 4. | Silica (Reinforcing Agent) | 15 |
| 5. | Stearic Acid (Cure Activator) | 1 |
| 6. | Zinc Oxide (Cure Activator) | 5 |
| 7. | N-(1, 3-dimethyl butyl)-N'-phenyl-p-phenylenediamine (Antidegradant) | 3 |
| 8. | Naphthenic Oil (Softener) | 8 |
| *9. | N-T-Butyl-2-Benzothiazolesulfenamide (Accelerator) | 0.8 |
| *10. | Sulfur (Vulcanizing Agent) (20% Oil) | 3.16 |

*Added on Open Mill

This composition was maintained constant throughout the experiments shown below with the acceptor and donor being varied, as shown. From the resulting compounds, test samples were formed around brassed steel tire cord, cured for 30 minutes at 300° F, and adhesion determined in a manner well known to those skilled in the art.

mine in the compound of Table 4 indicates that no such degradation of polyester cord is experienced when our

| Experiment Number | Acceptor | Parts Acceptor per 100 parts Rubber | Donor | Parts Donor per 100 parts Rubber | Pullout Adhesion (Pounds) | 95% Cure (Minutes) |
|---|---|---|---|---|---|---|
| 1E | Resorcinol | 0.5 | Hexamethylene-tetramine | 0.6 | 182 | 23.0 |
| 2E | " | 0.41 | Reaction product of 3 moles phenol to 1 mole hexa-methylenetetramine | 0.41 | 152 | 22.5 |
| 3E | " | 0.41 | " | 2.41 | 161 | 20.5 |
| 4E | " | 1.41 | " | 1.41 | 179 | 30.5 |
| 5E | " | 1.41 | " | 2.83 | 177 | 27.5 |
| 6E | " | 2.41 | " | 0.41 | 146 | 25.0 |
| 7E | " | 2.41 | " | 2.41 | 194 | 35.0 |
| 8E | " | 2.83 | " | 1.41 | 191 | 27.5 |

Experiment 1E is included to show comparison to prior art.

The composition of Table 3 was further used in a separate set of experiments shown below. The same control experiments were performed, but an RF resin was used as a methylene acceptor. The amounts of acceptor and/or donor were varied as shown.

improved methylene donor is used with either resorcinol or RF resins as acceptors. Experiment 3G discloses the use of a salt of hexamethylenetetramine and toluenesulfonic acid as a methylene donor and is included for comparison with the results disclosed in the Endter

| Experiment Number | Acceptor | Parts Acceptor per 100 parts Rubber | Donor | Parts Donor per 100 parts Rubber | Pullout Adhesion (Pounds) | 95% Cure (Minutes) |
|---|---|---|---|---|---|---|
| 1F | Resorcinol | 0.5 | Hexamethylene-tetramine | 0.6 | 143 | 19.0 |
| 2F | None | — | Reaction product of 3 moles phenol to 1 mole hexamethyl-lenetetramine | 1.41 | 125 | 17.0 |
| 3F | RF Resin | 0.41 | " | 0.41 | 142 | 26.5 |
| 4F | " | 0.41 | " | 2.41 | 120 | 19.0 |
| 5F | " | 1.41 | " | 1.41 | 191 | 21.5 |
| 6F | " | 1.41 | " | 2.83 | 147 | 18.5 |
| 7F | " | 2.41 | " | 0.41 | 154 | 21.5 |
| 8F | " | 2.41 | " | 2.41 | 161 | 20.5 |
| 9F | " | 2.83 | " | 1.41 | 165 | 24.0 |

Experiment 1F is included to show comparison to prior art.

As is well known in the art, the use of hexamethy-lenetetramine as a donor in rubber compounds reinforced with polyester cord tends to degrade the polyester cord at elevated temperatures. The use of the reaction product of phenol and hexamethylenetetramine in rubber compounds of Table 4 reinforced with polyester cord is shown below. The data relative to the use of the reaction product of phenol and hexamethylenetetraet al U.S. Pat. No. 3,638,703 mentioned above.

TABLE 4

| | Ingredients | Parts by Weight Amount |
|---|---|---|
| 1. | SMR-5L (Natural Rubber) | 100 |
| 2. | Carbon Black (Reinforcing Agent) | 45 |
| 3. | Silica (Reinforcing Agent) | 15 |
| 4. | Zinc Oxide (Cure Activator) | 5 |
| 5. | Stearic Acid (Cure Activator) | 1 |
| 6. | N-(1,3 dimethyl butyl)-N'phenyl-p-phenylenediamine (Antidegradant) | 3 |
| 7. | Naphthenic Oil (Softener) | 8 |
| *8. | 2-(Morpholinothio) Benzothiazole (Accelerator) | 0.8 |
| *9. | Sulfur (Vulcanizing Agent) (20% Oil) | 3.75 |

*Added on Open Mill

The composition of Table 4 was maintained constant throughout the experiments shown below wherein the acceptor and/or donor was varied. From the resulting compounds, test samples were cured around nine-inch lengths of polyester cord for 45 minutes at 300° F, and the tensile strength of the cord so cured was determined.

| Test No. | Acceptor | Amount of Acceptor Parts per 100 parts Rubber | Donor | Amount of Donor Parts per 100 parts Rubber | Treated* Polyester Lbs.Tensile | Untreated* Polyester Lbs.Tensile |
|---|---|---|---|---|---|---|
| 1G | RF Resin | 1.5 | Reaction product of 3 moles phenol to 1 mole hexamethylenetetramine | 1 | 32.5 | 31.5 |
| 2G | Resorcinol | 1.2 | " | 1.2 | 31.5 | 31.5 |
| 3G | RF Resin | 1.5 | Salt of Hexamethylenetetramine and Toluenesulfonic Acid | 1.5 | 31.5 | 33.0 |
| 4G | Cords Not Cured in Rubber | | | | 33.0 | 32.0 |

*"Untreated" polyester refers to polyester as spun ("grey polyester"), while treated polyester refers to polyester cord which is dipped in a styrene-butadiene-polyvinylpyridine terpolymer latex to which resorcinol and formaldehyde had been added, a procedure well known to those skilled in the art.

While the major portion of the examples revealed herein deals with the reaction product resulting from the reaction of three moles of phenol with one mole of hexamethylenetetramine, it is also shown that similar results may be expected from reaction products resulting from other molar ratio combinations. In fact, comparison of Experiments 2D, 4D and 5D suggests that the reaction products from the other molar ratio combinations may give adhesion results which are superior to the three-to-one molar reaction product. A comparison of the physical properties of the compounds obtained from these same three experiments similarly suggests that the 1:1 and 2:1 molar reaction products are more reinforcing than the 3:1 product. That is, in the resultant rubber compound, modulus is increased and elongation is decreased. In the interpretation of the results of the experiments revealed herein it should be noted that no attempt was made to optimize all of the components in a particular rubber compound. Furthermore, although only some of the available reinforcing substrates, such as cotton, rayon, nylon, fibreglass, steel, polyester, were included in the experimental work revealed herein, the adhesion obtained with all the substrates studied was excellent.

We wish it to be understood that the limited number of examples herein disclosed should not be interpreted as an attempt to define or delimit the scope of this invention for it will be readily apparent to those skilled in this art that changes and modifications may be made without departing from the spirit of the invention.

What we claim is:

1. In a substrate reinforced rubber structure wherein the substrate is selected from the group consisting of cotton, rayon, nylon, fiberglass, steel and polyester, the improvement which comprises compounding the rubber with a methylene acceptor selected from the group consisting of resorcinol and precondensed resorcinol-formaldehyde resin and as a donor, the reaction product of phenol and hexamethylenetetramine.

2. The structure as defined in claim 1 in which the donor is the reaction product of 3 moles of phenol with 1 mole of hexamethylenetetramine.

3. The structure as defined in claim 1 in which the donor is the reaction product of 2 moles of phenol with one mole of hexamethylenetetramine.

4. The structure as defined in claim 1 in which the donor is the reaction product of 1 mole of phenol with one mole of hexamethylenetetramine.

5. The structure as defined in claim 1 in which the polyester substrate is polyester cord which is protected from degradation.

6. A rubber compound comprising rubber compounded with a methylene acceptor selected from the group consisting of resorcinol and precondensed resorcinol-formaldehyde resin and as a donor, the reaction product of phenol and hexamethylenetetramine.

* * * * *